March 18, 1969    E. A. BENFIELD    3,433,925
WELDING APPARATUS
Filed March 21, 1967
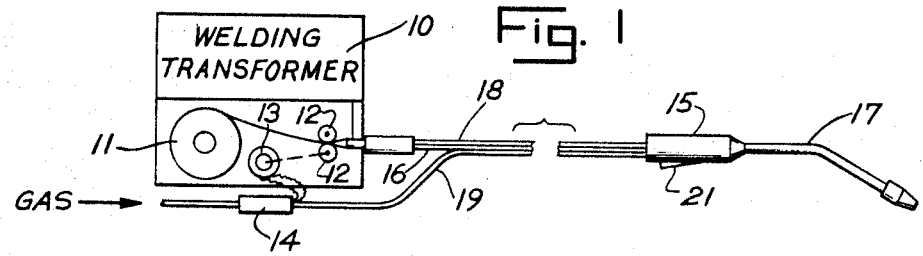
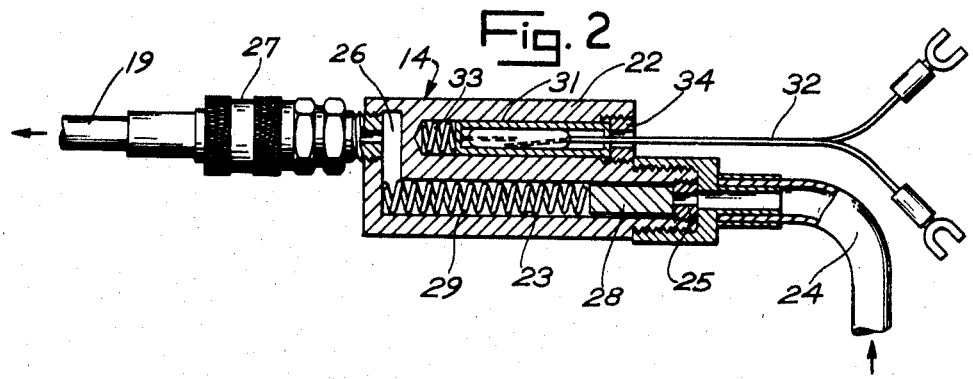
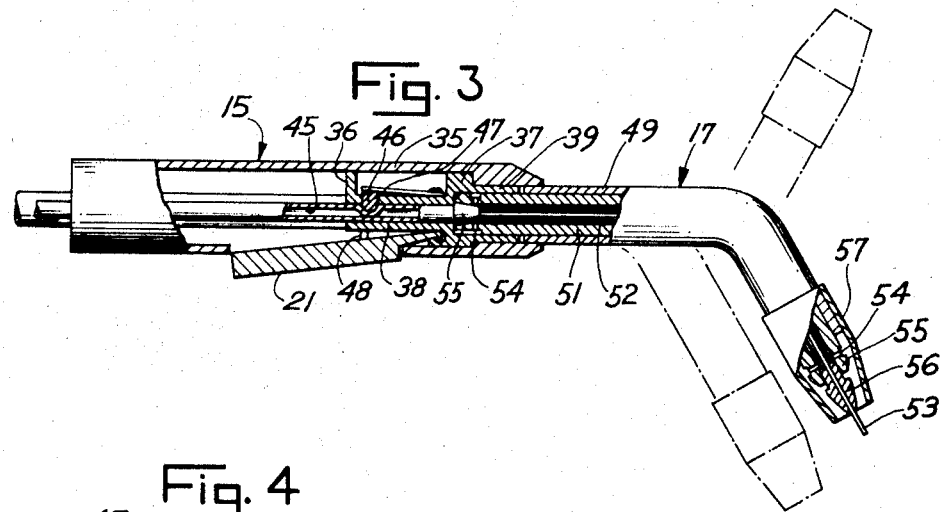
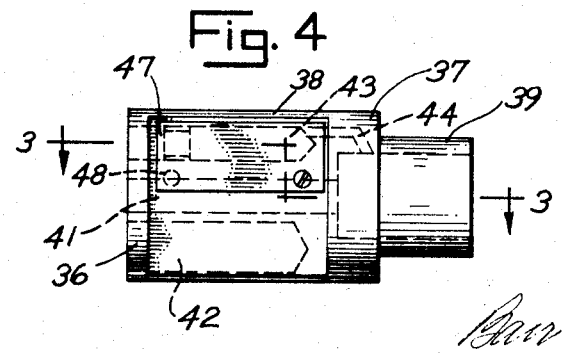
INVENTOR.
EDWARD A. BENFIELD
BY
ATTORNEYS

United States Patent Office 3,433,925
Patented Mar. 18, 1969

3,433,925
WELDING APPARATUS
Edward A. Benfield, Chicago, Ill., assignor, by mesne assignments, to Compak-O-Matic, Inc., Alsip, Ill., a corporation of Illinois
Filed Mar. 21, 1967, Ser. No. 624,745
U.S. Cl. 219—130       6 Claims
Int. Cl. B23k 9/00

ABSTRACT OF THE DISCLOSURE

Welding apparatus including an electrode wire feed control in response to the flow of shielding gas to the welding head. Also a reversible non-symmetrical welding tip holder.

---

This invention relates to welding apparatus, and more specifically to a wire feed control and reversible tip holder for electric welding apparatus.

In electric welding apparatus it is common to provide a welding head through which both a wire electrode and a shielding gas are fed, and which is provided with control means to start and stop both the wire feed means and the flow of gas. With such control, the wire feed starts before there is sufficient flow of gas established to blanket the work area so that the initial welding is performed in atmosphere. Such apparatus is also normally provided with a tip holder permanently or detachably secured to the head and operable in only one way so that it provides minimum flexibility and requires replacement when the tip holding end becomes burned or damaged.

It is one of the objects of the present invention to provide welding apparatus in which the flow of shielding gas is controlled by the operator at the welding head and in turn controls the wire feed. This insures that the flow of shielding gas is established before the wire feed starts so that all welding is performed in a blanket of gas.

Another object is to provide welding apparatus including a reversible tip holder either end of which can be attached to the welding head and either end of which can receive a welding tip.

The holder is preferably angular and is non-symmetrical so that the welding tip can be presented in different aspects when the holder is reversed.

The above and other objects and features of the invention will be more readily apparent from the following description when read in connection with the accompanying drawings, in which:

FIGURE 1 is a diagrammatic view of a complete welding apparatus embodying the invention;

FIGURE 2 is a sectional view through the flow-responsive control;

FIGURE 3 is a side view of the welding head with parts broken away and in section, and with the central portion of the section taken on the broken line 3—3 of FIGURE 4; and FIGURE 4 is a top plan view of the head insert in FIGURE 3.

The complete welding apparatus as shown diagrammatically in FIGURE 1, comprises a welding transformer or power supply unit 10 which may supply either A.C. or D.C. welding current which may be contained in a housing 10a. The same housing may also inclose the wire supply and the wire feed means. As shown, the electrode wire is contained on a reel or spool 11 rotatably mounted in the housing 10a, and is drawn therefrom and fed to the welding head by a pair of driver rollers 12. One of the driver rollers 12 is driven by an electric motor 13 which is supplied with operating current through a flow control switch indicated generally at 14.

The wire electrode is fed to and through a welding head 15 through a flexible conduit 16. The head carries tip holder 17 through which the electrode wire is fed to a tip where the welding is performed. The electrical connections are made from the welding transformer 10 to the head 15 through a suitable wire, as indicated at 18, which runs along and parallel with the conduit 16. Shielding gas is supplied from any suitable source through the flow control unit 14 and through a flexible conduit 19 to the head to flow through the head and out through the welding tip to blanket the work area as the welding is performed.

The welding head 15, as shown in FIGURE 1, is provided with a control lever or handle 21 by means of which flow of gas through the conduit 19 and the welding head can be controlled. When the gas flow is cut off, the control 14 will function to stop the motor 13 thereby stopping the wire feed. When gas is flowing through the conduit 19, the control 14 will operate to start the motor 13 thereby to start the wire feed. It will be noted, however, that the wire feed is not started until the flow of gas is established so that the work area is blanketed in shielding gas before the wire feed and the welding operations start.

The control unit 14 is shown in detail in FIGURE 2 as including a housing 22 formed with an elongated passage 23 therein, which communicates at its inlet end with a hose or conduit 24 leading from any suitable gas supply source. The gas enters the passage 23 through an orifice plate 25 secured in the inlet end of the passage and flows from the discharge end of the passage through a cross bore 26 in the housing and a suitable fitting 27 to the conduit 19. The bore or passage 23 receives a displacer 28 and a spring 29 in the passage urges the displacer 28 toward the inlet end thereof, as shown in FIGURE 2. The displacer 28 is preferably a magnet and either fits loosely in the passage 23 or is grooved on its exterior or drilled so that gas can flow therearound or therethrough to continue through the passage and into the conduit 19. When the gas flow is cut off or is at an extremely low level, the spring 29 will urge the displacer 28 to the inlet end of the passage, as shown. However, when the gas is flowing, the pressure drop across the displacer due to the gas flow, will move the displacer to the left against the spring 29 to a position approximately midway of the length of the passage 23.

The housing 22 is provided with a second bore which receives a magnetically operable switch 31. This switch may be of a type well known in the art as a reed switch embodying flexible electrodes encased in an insulating housing and normally separated to open the circuit between them. However, when the magnetic displacer 28 moves to a position substantially opposite to the reeds in the switch, they will be moved together to complete a circuit. The switch contacts may be connected through wires 32 to the motor 13 so that the motor will be energized when there is flow through the conduit 19 and the reed switch is closed and will be de-energized when there is no flow and the reed switch is open. The reed switch may conveniently be mounted by seating it against a spring 33 at one end and securing it in the bore in the housing by a threaded ring 34 at the outer end of the bore.

The head 15, as best seen in FIGURES 3 and 4, comprises an outer housing 35 having a cylindrical bore through the major part of its length and cut away at one side so that the control lever 21 may project therethrough and having a reduced bore at one end. The housing 35 is adapted to receive a core member, as best seen in FIGURE 4, which comprises end rings 36 and 37 fitting slidably in the larger diameter bore in the housing and joined by a flattened portion 38. A tubular socket 39 projects from the end ring 37 and fits into the reduced bore portion of the housing 35, as best seen in FIGURE 3. The flattened portion 38 of the core is formed with three spaced parallel passages or bores, including a central passage 41 through which the welding wire passes, a side passage 42 to receive the electrical connections extending through the conduit 18 and a second side passage 43 to which the conduit 19 is connected. As shown in FIGURE 4, the side passage 43 communicates through an angular passage 44 with the socket 39 at a point spaced a short distance from the end thereof which joins the passage 41.

As shown in FIGURE 3, the passage 43 receives one end of a flexible conduit or hose 45 which may be a continuation of the conduit 19 or which may be a separate piece of flexible hose inserted in the passage 43 and communicating therethrough with the conduit 19. The flattened portion 38 is formed in registry with the passage 43 with an opening in one side thereof through which a plug 46 projects. The plug 46 is pressed downwardly by a spring 47 which is secured at one end to the flattened portion 38 and overlies the plug 46 at its other end. The spring 47 normally presses the plug 46 downwardly, as shown in FIGURE 3, to collapse the tube 45 and to shut off flow of shielding gas therethrough.

The lever or handle 21 is pivoted at one end in the circular end flange 37 of the core member as shown in FIGURE 3, and at a point spaced from its pivot engages a push rod 48 which extends through a bore in the flattened portion 38 of the core member to engage the spring 47. When the lever 21 is pressed upwardly by an operator, the push rod 48 will raise the spring 47 allowing the plunger 46 to rise and opening the tube 45 for flow of shielding gas therethrough.

The socket 39 is adapted detachably to receive one end of the tip holder 17. As best seen in FIGURE 3, the tip holder comprises an outer sheath 49 and an inner tubular body 51 which extends beyond the ends of the sheath, as shown. The tubular body is preferably lined with a tightly coiled wire liner 52 through which the welding wire, as indicated at 53, is adapted to pass. Sufficient space is provided between the welding wire and the coil 52 and between the coil 52 and the inner walls of the tubular passage in the body 51 for flow of shielding gas through the tip holder.

According to one feature of the invention, the tip holder is bent intermediate its ends at an acute angle as shown, and is non-symmetrical in that one end is longer than the other. Either end of the tip holder may be connected to the head, with the other end receiving a welding or contact tip through which the welding wire passes and adjacent to which the weld is made.

To mount the tip holder in the head, one end of the sheath 49 is inserted in the reduced bore in the housing 35 with the projecting end of the body 51 extending into the socket 39 as shown in FIGURE 3. The projecting end of the body 51 is formed with transverse and circumferential passages 54 which will register with the gas passage 44 when the tip holder is properly inserted, so tht gas flowing through the conduit 19 and the passages 43 and 44 can enter the tip holder and flow outwardly therethrough around the welding wire. Each end of the body 51 is also formed with an outwardly tapered socket 55 to receive a welding or contact tip 56 having a tapered shank of a size to fit into the socket, and a bore through which the welding wire 53 may pass. The outer end of the tip holder is preferably covered by a tapered sleeve 57 which fits slidably over the end of the sheath 49 and tapers inwardly as shown in FIGURE 3 to terminate substantially flush with the outer end of the welding tip 56. Gas flowing through the bore and the tip holder will flow out through the openings 54 adjacent to the welding tip 56 and will be directed by the sheath 57 around the tip holder in the direction that the welding wire passes therethrough to blanket the work area. To reverse the tip holder the sheath 57 and welding tip are removed from the outer end thereof, the tip holder is then reversed and mounted in the head, and the sheath 57 and welding tip 56 are mounted on the outer end thereof. It will be seen that by reversing the tip holder the position of the welding tip relative to the head is changed both longitudinally and laterally, while the tip holder can easily be rotated in the socket 39 to change its angular relationship. Thus a maximum degree of flexibility in reaching the work area is provided.

In operation, the operator will first press the lever 21 to open the valve and establish flow of shielding gas which will flow through the welding tip around the work area. It is not until after the flow of shielding gas has been established at a predetermined rate that the switch 31 will be closed to initiate the wire feed and the welding operation so that it is assured that the work is adequately shielded before welding commences.

At the end of a welding operation, the operator will release the lever 21 to allow the valve to close and stop the gas flow. This is not an instantaneous operation, however, and gas will continue to flow due to pressure in the lines, for a brief period. However, the switch 31 will be opened as soon as the gas flow falls below a predetermined value short of complete shutoff so that welding and wire feed will be discontinued after the arc is extinguished. Thus the gas will continue to flow after extinguishing of the arc so that molten metal at the weld will be protected from contamination from the atmosphere.

The operator can also exercise control over the prepurging and post-purging gas flow by regulating the amount of opening of the gas flow valve. Assuming, for example, that it requires a flow rate of 20 cubic feet of gas per hour to actuate the switch 31, the operator can, by depressing the lever 21 only part way, establish or maintain a gas flow slightly below this amount which will be adequate to blanket and shield the weld area while still being insufficient to operate the control switch. In this way the operator can establish a pre-purge gas flow before starting to weld, and can maintain a post-purge gas flow after completion of the welding for any desired amount of time.

While one embodiment of the invention has been shown and described in detail, it will be understood that this is illustrative only and is not to be taken as a definition of the scope of the invention, reference being had for this purpose to the appended claims.

What is claimed is:

1. Wire feed control for welding apparatus comprising a welding head, means to feed a wire electrode to and through the welding head, a conduit to supply shielding gas to the welding head to flow therethrough, valve means in the welding head to control the flow of gas through the conduit, and control means in the conduit responsive to the flow of gas therethrough to control the wire feed means to stop the wire feed means when no gas is flowing and to energize the wire feed means when gas is flowing.

2. The appaartus of claim 1 in which the control means includes means defining a passage communicating with the conduit and through which the gas flows, a part fitting movably in the passage around which the gas flows, spring means urging the part toward the entrance end of the passage, the part being moved toward the discharge end of the passage by the flow of gas through the passage, and a control device operated by movement of the part.

3. The apparatus of claim 2 in which the part is a magnet and the control device is a magnetically operated switch.

4. The apparatus of claim 1 in which the head terminates in an outwardly facing socket through which the wire is fed and into which the gas is supplied and including an angular non-symmetrical tip holder formed at each end with a plug to fit into the socket and having a passage therethrough for passage of the wire and gas and having sockets at its ends to receive a welding tip.

5. The apparatus of claim 4 including a tapered sleeve to fit over the outer end of the tip holder to direct gas over the welding in the direction of movement of the wire fed therethrough.

6. In welding apparatus, a head formed with an outwardly facing socket at one end, means to feed a welding wire centrally through the socket, means to supply shielding gas to the socket, an angular nonsymmetrical tip holder formed at each end with a plug to fit into the socket and having a passage therethrough for the wire and the gas and terminating at each end in a socket to receive a welding tip.

References Cited

UNITED STATES PATENTS

| | | | |
|---|---|---|---|
| 2,630,513 | 3/1953 | Redmond | 219—136 |
| 2,862,098 | 11/1958 | Hasselhorn | 219—74 |
| 3,042,791 | 7/1962 | Reeh | 219—75 |
| 3,305,664 | 2/1967 | Kensrue | 219—130 |

RICHARD M. WOOD, *Primary Examiner.*

C. L. ALBRITTON, *Assistant Examiner.*

U.S. Cl. X.R.

219—131; 228—55